United States Patent [19]

Moradi-Araghi

[11] Patent Number: 5,399,269

[45] Date of Patent: Mar. 21, 1995

[54] GELATION OF WATER SOLUBLE POLYMERS

[75] Inventor: Ahmad Moradi-Araghi, Bartlesville, Okla.

[73] Assignee: Phillips Petroleum Company, Bartlesville, Okla.

[21] Appl. No.: 220,140

[22] Filed: Mar. 30, 1994

Related U.S. Application Data

[63] Continuation-in-part of Ser. No. 867,635, Apr. 13, 1992, abandoned.

[51] Int. Cl.$^6$ ............................................. E21B 33/138
[52] U.S. Cl. ..................................... 507/221; 507/903; 507/222; 507/224; 507/225; 507/227; 507/228; 507/229; 166/270; 166/295; 523/130
[58] Field of Search ................. 166/295, 270; 523/130; 252/8.551

[56] References Cited

U.S. PATENT DOCUMENTS

| | | | |
|---|---|---|---|
| 3,795,376 | 3/1974 | Eilers et al. | 166/295 |
| 4,009,755 | 3/1977 | Sandiford | 166/270 |
| 4,069,869 | 1/1978 | Sandiford | 166/270 |
| 4,147,211 | 4/1979 | Sandiford | 166/270 |
| 4,167,500 | 9/1979 | Jazenski et al. | 260/29.3 |
| 4,440,228 | 4/1984 | Swanson | 166/274 |
| 4,476,033 | 10/1984 | Josephson | 252/8.55 C |
| 4,644,020 | 2/1987 | Stahl | 522/79 |
| 4,663,367 | 5/1987 | Navratil et al. | 523/130 |
| 4,799,548 | 1/1989 | Mumallah et al. | 166/288 |
| 4,822,842 | 4/1989 | Mumallah et al. | 524/346 |
| 4,858,693 | 8/1989 | Navratil et al. | 166/295 |
| 4,907,656 | 3/1990 | Sanchez et al. | 166/270 |
| 4,926,943 | 5/1990 | Hoskin | 166/270 |
| 4,934,456 | 6/1990 | Moradi-Araghi | 166/270 |
| 4,940,091 | 7/1990 | Shu et al. | 166/270 |
| 4,974,677 | 12/1990 | Shu | 166/270 |
| 4,994,194 | 2/1991 | Moradi-Araghi | 252/8.551 |
| 5,043,364 | 8/1991 | Moradi-Araghi et al. | 523/130 |
| 5,179,136 | 1/1993 | Moradi-Araghi | 523/130 |

FOREIGN PATENT DOCUMENTS 62-197402  6/1987  Japan.

*Primary Examiner*—Gary Geist
*Attorney, Agent, or Firm*—Lucas K. Shay

[57] ABSTRACT

A gelable composition and process are disclosed that delay the gelation and increase the gel strength of gelled water soluble acrylamide-containing polymers contains: (1) a water dispersible first crosslinking compound selected from the group consisting of p-aminosalicylic acid, furfuryl alcohol, RArOC(O)R' and HOArC-(O)OR" wherein Ar represents a phenyl group which can be substituted or non-substituted; R is a hydrogen or a carboxylic group; R' is a $C_1$–$C_6$ alkyl; R" is a hydrogen, a phenyl group, or a $C_1$–$C_6$ alkyl; and when R is a carboxylic group, R and C(O)OR" can be at ortho, meta, or para position with respect to the OC(O)R' group and the OH group, respectively; (2) a water dispersible second crosslinking compound selected from the group consisting of aldehydes and aldehyde-generating compounds; (3) a water soluble acrylamide-containing polymer; and (4) water.

34 Claims, No Drawings

GELATION OF WATER SOLUBLE POLYMERS

This application is a continuation-in-part of application Ser. No. 07/867,635, filed Apr. 13, 1992 now abandoned.

FIELD OF THE INVENTION

The present invention relates to gelation of water soluble polymers by organic crosslinking agents and to a gelable composition that increases the gel strength of the gelled water soluble polymers.

BACKGROUND OF THE INVENTION

It is well known to those skilled in the art that gelled water soluble polymers are useful in enhanced oil recovery operations. They have been used to alter the permeability of underground formations in order to enhance the effectiveness of water flooding operations.

The polymers along with an appropriate crosslinking agent are injected in an aqueous solution into the formation. They percolate into and gel in the regions having the highest water permeability. Any fluids injected into the formation in subsequent flooding operations will then be diverted away from the gels into regions of the formation having a lower water permeability.

A water-dispersible phenolic compound and a water-dispersible aldehyde have been used together as crosslinking agents for the gelation of water soluble polymers in enhanced oil recovery operations. For example, U.S. Pat. No. 4,799,548 discloses using a phenolic compound and an aldehyde for the formation of gelled water soluble polymers. However, the water soluble polymers gel fairly quickly, together with these compounds, after being injected into the formation. Quite often only the regions near the well bore are treated because the polymers gel before they have an opportunity to permeate throughout the entire formation. Furthermore, the polymers form gels that do not withstand the reservoirs' high temperature and high salinity environment over a long period of time to effectively alter the permeability of the underground formations. These gelled polymers are exposed to numerous mechanical forces within the formation which tend to promote the breakdown of the gels. When the gels break down, oil production decreases and it is necessary to retreat the formation with more water soluble polymers.

It would therefore be a significant contribution to the art to have a composition that would delay the rate of gelation of the water soluble polymers and a process that would increase the gel strength of water soluble polymers.

SUMMARY OF THE INVENTION

It is an object of the present invention to provide a composition for delaying the rate at which water soluble polymers are gelled by organic crosslinking agents. It is also an object of the present invention to provide a composition having increased gel strength of the water soluble polymer gels. It is a further object of the present invention to provide a gel composition of water soluble polymers that can withstand high temperature over a long period of time.

The present invention has the advantage of using environmentally substantially less toxic crosslinking agents. Other objects, features, advantages and aspects of the present invention will become apparent as the invention is more fully described in the following disclosure and claims.

According to the present invention, a gelable composition is provided which comprises: (1) a water dispersible first crosslinking compound selected from the group consisting of aspirin, p-aminosalicylic acid, furfuryl alcohol, $RArOC(O)R'$ and $HOArC(O)OR''$ where Ar represents a phenyl group which can be non-substituted or substituted; R is a hydrogen or a carboxylic group; $R'$ is a $C_1$-$C_6$ alkyl; $R''$ is a hydrogen, a phenyl group, or a $C_1$-$C_6$ alkyl; and when R is a carboxylic group, R and $C(O)OR''$ can be at ortho, meta, or para position with respect to the $OC(O)R'$ group and the OH group, respectively; (2) a water dispersible second crosslinking compound selected from the group consisting of aldehydes and aldehyde-generating compounds; (3) a water soluble acrylamide-containing polymer; and (4) water.

According to another embodiment of the present invention, a process for reducing the permeability of a water-out or oil-depleted zones in high temperature subterranean formation comprises injecting a gelable composition comprising: (1) a water dispersible first crosslinking compound selected from the group consisting of aspirin, p-aminosalicylic acid, furfuryl alcohol, $RArOC(O)R'$ and $HOArC(O)OR''$ where Ar represents a phenyl group which can be non-substituted or substituted; R is a hydrogen or a carboxylic group; $R'$ is a $C_1$-$C_6$ alkyl; $R''$ is a hydrogen, a phenyl group, or a $C_1$-$C_6$ alkyl; and when R is a carboxylic group, R and $C(O)OR''$ can be at ortho, meta, or para position with respect to the $OC(O)R'$ group and the OH group, respectively; (2) a water dispersible second crosslinking compound selected from the group consisting of aldehydes and aldehyde-generating compounds; (3) a water soluble acrylamide-containing polymer; and (4) water; into the formation and the gelable composition forms a gel in the formation.

DETAILED DESCRIPTION OF THE INVENTION

The first crosslinking compound useful for the present invention is water dispersible and is selected from the group consisting of aspirin, p-aminobenzoic acid, furfuryl alcohol, $RArOC(O)R'$ and $HOArC(O)OR''$ where Ar is a phenyl group which can be non-substituted or substituted; R is a hydrogen or a carboxylic group; $R'$ is a $C_1$-$C_6$ alkyl; and $R''$ is a hydrogen, a phenyl group or a $C_1$-$C_6$ alkyl. The term "water dispersible" used herein is to describe a component of the composition that is truly water soluble or is dispersible in water to form a stable suspension. Suitable first crosslinking compounds include, but not limited to, p-aminosalicylic acid, furfuryl alcohol, phenyl acetate, phenyl propionate, phenyl butyrate, salicylic acid, phenyl salicylate, aspirin, p-hydroxybenzoic acid, methyl p-hydroxybenzoate, methyl o-hydroxybenzoate, ethyl p-hydroxybenzoate, o-hydroxybenzoic acid, hexyl p-hydroxybenzoate, and mixtures thereof. Presently preferred water dispersible first crosslinking compounds are phenyl acetate, phenyl salicylate, salicylic acid, p-aminobenzoic acid and methyl p-hydroxybenzoate.

Any water dispersible aldehyde, its derivative, or compound that can be converted into aldehyde can be utilized as the second crosslinking compound in the present invention. Thus, suitable second crosslinking compounds can be selected from the group consisting of aliphatic monoaldehydes, aromatic monoaldehydes, aliphatic dialdehydes, aromatic dialdehydes, and their derivatives. Preferred aldehydes and their derivatives can be selected from the group consisting of formaldehyde, paraformaldehyde, acetaldehyde, propionaldehyde, decanal, glutaraldehyde, terephthaldehyde, hexamethylenetetramine, and mixtures thereof.

The water dispersible first crosslinking compound is present in the composition in the range of from about 0.005 to about 5.0 weight percent, preferably from about 0.01 to about 2.0 weight percent, and most preferably from 0.03 to 1.0 weight percent based on the total weight of the composition. The second crosslinking compound is present in the composition in the range of from about 0.005 to about 5.0 weight percent, preferably from about 0.01 to about 2.0 weight percent, and most preferably from 0.03 to 1.0 weight percent.

As used in this application, the term "water soluble acrylamide-containing polymer" refers to those polymers which are homopolymers, copolymers, or terpolymers, and are truly water soluble or those which are dispersible in water or other aqueous medium to form a colloidal suspension which can be pumped into a formation and gelled therein.

The water soluble acrylamide-containing polymers which are suitable for use in the present invention include those which contain from 5 to 100 mole percent of at least one monomer of the formula:

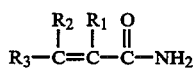

wherein $R_1$, $R_2$, and $R_3$ are selected from the group consisting of hydrogen or alkyl groups containing from 1 to 3 carbon atoms, of which acrylamide and methacrylamide are the preferred examples; and from 0 to 95 mole percent of at least one monomer selected from the group consisting of; (a) those monomers represented by the formula:

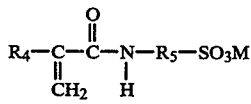

wherein $R_4$ is selected from the group consisting of hydrogen or alkyl radicals containing from 1 to 6 carbon atoms, $R_5$ is selected from the group consisting of alkylene radicals containing from 1 to 6 carbon atoms or an arylene radical containing from 6 to 10 carbon atoms, and M is selected from the groups consisting of hydrogen, ammonium, potassium, or sodium, of which 2-acrylamido-2-methylpropane sulfonic acid or sodium 2-acrylamide-2-methylpropane sulfonate are the preferred examples; or (b) monomers represented by the formula:

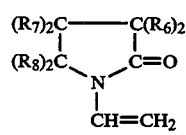

where $R_6$, $R_7$ and $R_8$ are independently selected from the group consisting of hydrogen or alkyl groups containing from 1 to 2 carbon atoms of which N-vinyl-2-pyrrolidone is the preferred example; or (c) at least one monomer selected from the group consisting of acrylic acid, sodium acrylate, potassium acrylate, ammonium acrylate, methacrylic acid, sodium methacrylate, potassium methacrylate, ammonium methacrylate, vinylsulfonic acid, sodium vinylsulfonate, potassium vinylsulfonate, ammonium vinylsulfonate, vinylbenzylsulfonic acid, N,N-dimethylacrylamide, sodium vinylbenzylsulfonate, potassium vinylbenzylsulfonate, vinylacetate, acrylonitrile, methacrylonitrile, vinyl alkyl ether, vinyl chloride, maleic anhydride, vinyl substituted cationic quaternary ammonium compounds, (acryloyloxyethyl)diethylmethylammonium methyl sulfate; or (d) mixtures thereof.

The polymerization of any of the above described monomers and their resulting polymers are well known to those skilled in the art. There are numerous references which disclose methods of polymerizing these monomers. For example, See U.S. Pat. No. 4,244,826.

The manner in which these monomers are polymerized into water soluble acrylamide-containing polymers or the resulting polymer is not critical to the practice of the present invention. Polymerization can be initiated by chemicals, irradiation, or any other techniques known to those skilled in the art.

The molecular weight of the water soluble acrylamide-containing polymers utilized in the present invention is not critical. It is presently preferred, however, that the polymer have a molecular weight of at least about 100,000 and more preferably 100,000 to 20,000,000. The upper limit is not critical as long as the polymer is still water dispersible and can be pumped into the formation.

The presently preferred class of water soluble acrylamide-containing polymers are those selected from the group consisting of homopolymers of acrylamide, homopolymers of methacrylamide, copolymers of acrylamide and acrylic acid, copolymers of acrylamide and potassium acrylate, copolymers of acrylamide and sodium acrylate, copolymers of acrylamide and N,N-dimethylacrylamide, copolymers of acrylamide and methacrylamide, copolymers of acrylamide and sodium 2-acrylamido-2-methylpropane sulfonate, copolymers of acrylamide and N-vinyl-2-pyrrolidone, terpolymers of acrylamide, N,N-dimethylacrylamide and 2-acrylamido-2-methylpropane sulfonate, and terpolymers of acrylamide, N-vinyl-2-pyrrolidone, and sodium 2-acrylamido-2-methylpropane sulfonate. The ratio of the monomers in the above-described polymers is not critical; provided however, that at least 5 mole % of acrylamide or methacrylamide is present in the above-described polymers.

Particularly preferred are homopolymers of acrylamide, copolymers of acrylamide and sodium acrylate, copolymers of acrylamide and sodium 2-acrylamido-2-methylpropane sulfonate, copolymers of acrylamide and N-vinyl-2-pyrrolidone, and a terpolymers of N-vinyl-2-pyrrolidone, acrylamide and sodium 2-acrylamido-2-methylpropane sulfonate. However, other polymers with more subunits may also be utilized in the practice of this invention. Additionally, within the scope of this invention is the use of combinations of homopolymers, copolymers, terpolymers, and tetrapolymers utilizing the above listed monomers.

The water soluble acrylamide-containing polymer is present in the composition in the amount of from about 0.05 to about 10 weight percent, preferably from about 0.1 to about 5 weight percent, and most preferably from 0.2 to 4 weight percent. The concentration of polymer in the composition depends to some degree upon the molecular weight of the polymer. A high molecular weight results in a higher viscosity of the resulting gel for a particular concentration of polymer.

Water generally makes up the rest of the inventive composition.

Any suitable method can be employed for preparing the composition of the invention. Thus, any suitable mixing technique or order of addition of the components of the composition to each other can be employed. However, it is generally preferred that the polymer be dispersed in water before contacting the polymer with the other components. The mixing order can vary with the type of polymer used.

The use of gelled polymers to alter the water permeability of underground formations is well known to those skilled in the art. Generally, an aqueous solution containing the polymer and a crosslinking agent is pumped into the formation so that it can diffuse into the more water permeable portions of the formation and alter that water permeability by gelling therein.

The present invention can be used in a similar manner. An aqueous solution containing the water soluble acrylamide-containing polymer, aldehyde compound, and aromatic compound can be pumped into the formation so that it alters the water permeability of the formation in a similar manner when gelation takes place. The present invention's advantage lies in the fact that, since the gelation of the polymer is delayed, the polymer has an opportunity to travel farther into the formation and effect the water permeability of portions of the formation that would normally go untreated due to their distance from the injection site. In addition, the resulting gel exhibits improved strength.

The nature of the underground formation treated is not critical to the practice of the present invention. The composition of the present invention can be used in or can be injected into, fresh water, salt water, or brines, as well as at a temperature range of from about 70° F. to about 400° F., preferably from about 150° F. to about 350° F., and most preferably from 200° F. to 300° F.

The following specific examples are intended to illustrate the advantages of this invention, but are not intended to unduly limit this invention.

EXAMPLE I

The purpose of this example is to illustrate the gelation of a water-soluble polymer by phenol and formaldehyde and to use this example as a control.

A 0.7 percent solution of a terpolymer composed of 30 wt % of N-vinyl-2-pyrrolidone, 15 wt % of acrylamide, and 55 wt % of sodium 2-acrylamido-2-methylpropane sulfonate was prepared by mixing 11.3 ml of an inverse emulsion which contained 32.4 wt % of the active terpolymer with 500 ml of synthetic sea water.

The synthetic sea water used has the following formula:

| | |
|---|---|
| NaHCO$_3$ | 3.69 grams |
| Na$_2$SO$_4$ | 77.19 grams |
| NaCl | 429.00 grams |
| CaCl$_2$.2H$_2$O | 29.58 grams |
| MgCl$_2$.6H$_2$O | 193.92 grams |
| distilled H$_2$O q.s. to | 18 liters |

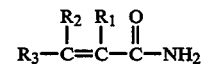

An aliquot of 88% phenol (0.233 g) and 0.511 ml of 37% formaldehyde were added to 100 ml of the polymer and synthetic sea water mixture described above, to provide a concentration of 2,000 ppm each of phenol and formaldehyde. Similarly, 0.582 g of phenol and 1.278 ml of formaldehyde were added to 100 ml of the polymer and synthetic sea water mixture to generate a concentration of 5,000 ppm each of phenol and formaldehyde.

Then 20 ml samples of each solution were placed in three ampules (2.2 cm by 22.5 cm). The six ampules were sealed under nitrogen and then placed upright in compartmented aluminum boxes with relief holes and placed in ovens heated to and held at 200° F., 250° F., and 300° F. Periodically, the ampules were removed from the oven and the mechanical strength of the gels was determined behind a protective shield.

As crosslinking developed, small microgels or granules began to appear, i.e., a very slight gel formed. Continued growth of the microgels to globule occured next, referred to as slight gel. Larger gel masses next appeared, referred to as partial gel, followed by the development of stronger gels with measurable tongue lengths. The tongue lengths were measured by placing each ampule horizontally behind a shield for safety, allowing the hot gelling composition to move to its equilibrium position and then measuring the length of the tongue formed. As gelation progressed with time, stronger gels and shorter tongue lengths were developed. Additionally, when some gels synkresed, liquid content in the ampules were measured by the length of the liquid with the ampules in vertical positions. The mechanical strength is expressed mathematically as Percent Gel Strength=$(AL$-$TL)\times 100/AL$ where AL equals ampule length (in centimeters), and TL equals the tongue length of the gel measured in centimeters from the point at which the gel contacts the entire circumference of the tube to the farthest point to which the gel has spread. Thus the strongest gels would have a gel strength of 100% and the weakest gels would have a gel strength of 0. The tongue length results are shown in Table I.

TABLE I

| Temp X-linker Conc* (ppm) Aging Time (days) | Gelation of 0.7% Terpolymer Solution in Synthetic Seawater with Phenol and Formaldehyde at 200° F., 250° F. and 300° F. ||||||
|---|---|---|---|---|---|---|
| | Tongue Length or Gel Length (GL) in Centimeters ||||||
| | 200° F. || 250° F. || 300° F. ||
| | 2,000 | 5,000 | 2,000 | 5,000 | 2,000 | 5,000 |
| 0.3 | T | VT | 19.6 | 14.5 | 13.3 | 15.8 |

TABLE I-continued

Gelation of 0.7% Terpolymer Solution in Synthetic Seawater with
Phenol and Formaldehyde at 200° F., 250° F. and 300° F.

| Temp<br>X-linker<br>Conc* (ppm)<br>Aging Time<br>(days) | Tongue Length or Gel Length (GL) in Centimeters | | | | | |
|---|---|---|---|---|---|---|
| | 200° F. | | 250° F. | | 300° F. | |
| | 2,000 | 5,000 | 2,000 | 5,000 | 2,000 | 5,000 |
| 0.9 | VSG | 16.6 | 13.5 | 12.5 | 5.0 | 1.5 |
| 1.0 | VSG | 16.6 | 14.0 | 13.0 | 4.6 | 1.3 |
| 1.1 | VSG | 16.5 | 14.6 | 13.0 | 5.0 | 1.2 |
| 1.8 | 15.6 | 12.5 | 10.6 | 11.5 | 3.2 | 1.1 |
| 2.1 | 16.0 | 12.5 | 12.2 | 7.6 | 2.8 | 2.2 |
| 2.8 | 15.2 | 11.2 | 9.5 | 9.5 | 2.6 | 1.8 |
| 3.1 | 14.8 | 6.8 | 7.7 | 9.3 | 0.9 | 0.8 |
| 4.0 | 11.8 | 5.2 | 7.0 | 4.7 | 2.2 | 1.2 |
| 6.9 | 5.5 | 6.5 | 4.3 | 5.0 | 0.9 | 3.0 + 0.5L |
| 8.1 | 7.0 | 7.0 | 6.0 | 3.8 | 1.0 | 7.0GL + 0.5L |
| 8.8 | 7.6 | 7.5 | 7.5 | 4.0 | 1.0 | 5.0GL + 0.5L |
| 9.9 | 7.5 | 7.8 | 5.9 | 3.5 | 0.8 | — |
| 13.8 | 9.5 | 7.5 | 3.4 | 2.4 | 0.7 | 2.1GL + 1.0L |
| 21.9 | 9.0 | 7.5 | 3.2 | 2.0 | 4.0 | 3.0GL + 1.0L |
| 28.0 | 10.5 | 11.2 | 2.2 | 1.8 | 11.7GL + 0.2L | 7.5GL + 1.7L |
| 35.0 | 11.5 | 10.5 | 2.6 | 2.0 | 11.5GL + 0.3L | 7.3GL + 2.0L |
| 63.0 | 10.8 | 10.5 | 2.5 | 2.5 + 0.1L | 9.2GL + 1.0L | 7.0GL + 2.0L |
| 93.0 | 11.4 | 11.5GL | 3.5 | 3.3 + 0.1L | 9.4GL + 1.5L | 6.5GL + 4.0L |
| 157.0 | — | — | 6.0 | 5.0 + 0.2L | 8.3GL + 1.5L | 5.6GL + 2.7L |
| 197.0 | 12.5 | 12.7 | 6.5 | 6.3 + 0.3L | 8.8GL + 1.5L | 5.7GL + 2.7L |
| 233.0 | 13.5 | 12.6 | 7.2 | 6.8 + 0.3L | 9.0GL + 1.5L | 6.4GL + 4.0L |
| 265.0 | 12.6GL | 15.9GL | 6.5 | 7.1 + 0.3L | 9.3GL + 1.5L | Terminated |
| 303.0 | 17.0GL | 12.7GL | 9.7 | 7.3 + 0.3L | 9.3GL + 1.5L | — |
| 379.0 | 14.4GL + 0.2L | 16.3GL | 8.5 | 7.6 + 0.3L | 10.8GL + 1.6L | — |
| 510.0 | 13.7GL + 0.4L | 15.6GL | 10.3 | 7.9 + 0.3L | 14.0GL + 1.8L | — |
| 562.0 | 17.DGL + 0.5L | 15.7GL | 11.2 | 8.7 + 0.3L | 6.9GL + 2.7L | — |
| 633.0 | 18.6GL + 0.4L | 15.6GL | 12.6 | 9.3 + 0.4L | 7.4GL + 2.7L | — |
| 791.0 | 16.6GL + 0.2L | 13.7GL | 12.5 + 0.2L | 8.7 + 0.5L | 7.7GL + 3.7L | — |
| 912.0 | 19.0GL + 0.4L | 16.6GL | 16.2GL + 0.2L | 9.9 + 0.4L | 6.9GL + 4.0L | — |
| 1109.0 | 18.7GL + 0.4L | 16.2GL | 16.0GL + 0.3L | 10.5 + 0.4L | 7.0GL + 4.0L | — |
| 1289.0 | 18.6GL + 0.4L | 16.5GL | 14.7GL + 0.3L | 11.4 + 0.3L | Terminated | — |
| 1535.0 | 18.2GL + 0.4L | 15.3GL | 14.1GL + 0.4L | 12.8GL + 0.4L | — | — |

*The numbers given represent the concentration of each crosslinker.
T = Thick, VT = Very Thick, VSG = Very Slight Gel.
GL = Gel Length, L = the height of liquid separated from the gel, measured when ampule was at vertical position.

Table I shows that after 1535 days at 200° F. in the presence of 2,000 ppm each of phenol and formaldehyde, relatively poor gel (based on the gel length of 18.2 cm and the liquid height of 0.4 cm) developed. The higher the liquid, the more syneresis was. Syneresis is an undesirable characteristics. Similarly, at 5,000 ppm concentration each of phenol and formaldehyde, faster gelation occurred and shorter gels were formed.

Table I also shows that, at higher temperature (250° F.) and at a given crosslinker concentration (2,000 ppm), the gelation rate increased resulting in decreased tongue length indicating improved gel strength. However, when the temperature was 300° F., excessive syneresis was observed in as short as 63 days (1.0 cm liquid) and then at 1109 days, the gel gave 4.0 cm of liquid indicating a severe syneresis.

EXAMPLE II

This example demonstrates that replacing formaldehyde with an aldehyde precursor, hexamethylenetetramine (HMTA), resulted in comparable gelation.

The runs were carried out the same as those described in Example I with the exception that HMTA was used in place of formaldehyde in the composition. The results are shown in Table II.

TABLE II

Gelation of 0.7% Terpolymer in Synthetic Seawater with
Phenol and Hexamethylenetetranine at 200° F., 250° F. and 300° F.

| Temp<br>X-linker<br>Conc* (ppm)<br>Aging Time<br>(days) | Tongue Length or Gel Length (GL) in Centimeters | | | | | |
|---|---|---|---|---|---|---|
| | 200° F. | | 250° F. | | 300° F. | |
| | 2,000 | 5,000 | 2,000 | 5,000 | 2,000 | 5,000 |
| 0.3 | T | VT | PG | 21.8 | 22.1 | 23.0 |
| 0.9 | VSG | PG | 13.5 | 6.5 | 13.2 | 5.7 |
| 1.0 | VSG | 21.6 | 13.5 | 8.0 | 14.0 | Terminated |
| 1.1 | VSG | 20.4 | 13.0 | 5.2 | 13.8 | — |
| 1.8 | PG | 20.0 | 12.4 | 5.5 | 11.2 | — |
| 2.1 | 15.2 | 19.1 | 11.4 | 5.8 | 9.7 | — |
| 2.8 | 18.0 | 18.2 | 6.7 | 6.0 | 9.7 | — |
| 3.1 | 18.0 | 19.4 | 11.0 | 5.8 | 9.5 | — |

TABLE II-continued

Gelation of 0.7% Terpolymer in Synthetic Seawater with
Phenol and Hexamethylenetetramine at 200° F., 250° F. and 300° F.

| Temp X-linker Conc* (ppm) Aging Time (days) | 200° F. 2,000 | 200° F. 5,000 | 250° F. 2,000 | 250° F. 5,000 | 300° F. 2,000 | 300° F. 5,000 |
|---|---|---|---|---|---|---|
| 4.0 | 14.7 | 10.0 | 7.6 | 6.0 | 9.6 | — |
| 6.9 | 8.0 | 6.5 | 9.8 | 7.5 | 9.8 | — |
| 8.1 | 8.0 | 5.8 | 7.4 | 6.1 | 8.9 | — |
| 8.8 | 13.8 | 5.8 | 9.8 | 7.0 | 7.0 | — |
| 9.9 | 10.5 | 6.2 | 9.0 | 7.6 | 7.4 | — |
| 13.8 | 14.5 | 8.5 | 8.5 | 5.0 | 7.0 | — |
| 21.9 | 8.3 | 9.8 | 8.0 | 4.5 | 6.0 | — |
| 28.0 | 14.2 | 10.0 | 5.2 | 4.5 | 4.7 | — |
| 35.0 | 11.0 | 10.0 | 7.0 | 3.3 | 8.5 | — |
| 63.0 | 10.5 | 10.5 | 8.0 | 3.0 | 4.0 | — |
| 93.0 | 9.3 | 14.5 | 6.2 + 0.2L | 3.4 + 0.1L | 14.0GL + 0.8L | — |
| 157.0 | — | — | 12.3 | 2.0 | 9.7GL + 2.1L | — |
| 197.0 | 5.9 | 5.4 | 4.5 + 0.3L | 1.7 | 12.5GL + 2.5L | — |
| 233.0 | 7.2 | 3.8 | 8.6 + 0.8L | 2.9 | 7.5GL + 3.7L | — |
| 265.0 | 7.7 | 11.0 | 9.3 + 0.8L | 4.5 | 10.6GL + 3.6L | — |
| 303.0 | 4.3 | 7.8 | 11.5 + 0.9L | 2.8 | Terminated | — |
| 379.0 | 17.0GL | 11.0 | 10.6GL + 1.1L | 3.9 | — | — |
| 510.0 | 11.2GL + 1.5L | 7.8 + 0.3L | 10.5GL + 1.1L | 4.0 + 0.3L | — | — |
| 562.0 | 12.5GL + 1.5L | 8.9 + 0.5L | 11.3GL + 1.1L | 4.4 + 0.4L | — | — |
| 633.0 | 14.1GL + 1.7L | 9.4 + 0.4L | 11.1GL + 1.1L | 3.7 + 0.3L | — | — |
| 791.0 | 12.7GL + 1.5L | 7.5 + 0.3L | 11.0GT + 1.0L | 5.2 + 0.2L | — | — |
| 912.0 | 13.5GL + 1.7L | 10.3 + 0.5L | 14.0GL + 1.1L | 5.5 + 0.3L | — | — |
| 1109.0 | 12.9GL + 2.2L | 9.9 + 0.6L | 11.1GL + 1.4L | 5.8 + 0.4L | — | — |
| 1289.0 | 12.7GL + 1.9L | 9.5 + 0.5L | 13.5GL + 1.2L | 12.4GL + 0.3L | — | — |
| 1535.0 | 11.9GL + 1.9L | 9.4 + 0.6L | 11.3GL + 1.8L | 12.2GL + 0.2L | — | — |

*The numbers given represent the concentration of each crosslinker.
T = Thick, VT = Very Thick, VSG = Very Slight Gel, PG = Partial Gel.
GL = Gel Length, L = the height of liquid separated from the gel, measured when ampule was at vertical position.

Table II shows that the gels produced with HMTA and phenol as crosslinkers are very comparable in quality to those made with phenol-formaldehyde crosslinking system at equal concentrations and temperatures.

EXAMPLE III

This example demonstrates that the invention composition comprising HMTA and methyl p-hydroxybenzoate produced superior gels to those made with phenol and formaldehyde or with phenol and HMTA as crosslinkers.

The runs were carried out the same as those described in Example I except that the crosslinking agents were methyl p-hydroxybenzoate and HMTA and that 3,500 ppm instead of 5,000 ppm concentration of crosslinkers was tested. The test results are shown in Table III.

TABLE III

Gelation of 0.7% Terpolymer in Synthetic Seawater with
Methyl p-Hydroxybenzoate and Hexamethylenetetramine
at 200° F., 250° F. and 300° F.

| Temp X-linker Conc* (ppm) Aging Time (days) | 200° F. 2,000 | 200° F. 3,500 | 250° F. 2,000 | 250° F. 3,500 | 300° F. 2,000 | 300° F. 3,500 |
|---|---|---|---|---|---|---|
| 0.2 | T | T | T | T | VSG | VSG |
| 0.9 | T | T | VSG-SG | VSG-SG | PG | SG |
| 1.0 | T | VT | S-PG | S-PG | PG | SG |
| 1.2 | T | VT | S-PG | S-PG | PG | SG |
| 3.9 | VSG | SG | SG | SG | PG | S-PG |
| 6.9 | SG | S-PG | SG | S-PG | PG | 19.8 |
| 11.9 | S-PG | PG | S-PG | S-PG | 16.9 | 11.2 |
| 18.1 | PG | 21.0 | PG | PG | 16.5 | 3.9 |
| 21.9 | PG | 20.0 | PG | PG | VSG | 12.4 |
| 29.0 | PG | 16.8 | PG | 16.0 | VSG | 11.4GL |
| 61.0 | 16.1 | 11.1 | 5.2 | 2.5 | VSG | 15.0GL + 1.0L |
| 71.0 | 16.0 | 11.1 | 4.0 | 2.3 | VSG | 15.0GL + 1.7L |
| 89.0 | 15.9 | 13.2 | 2.2 | 1.4 | VSG-SG | 19.0GL + 1.0L |
| 110.0 | 16.4 | 15.2 | 2.2 | 1.1 | VSG | 12.0GL + 1.0L |
| 120.0 | 16.4 | 15.1 | 2.5 | 1.6 | VSG | 14.1GL + 1.5L |
| 155.0 | 16.2 | 15.4 | 2.5 | 2.3 | VSG | 8.8GL + 1.5L |
| 279.0 | 13.0 | 8.5 | 3.5 | 0.0 | NG | 11.0GL + 1.5L |
| 383.0 | 12.7 | 7.3 | 4.7 | 3.4 | Thin | 16.5GL + 2.0L |
| 550.0 | 7.9 | 4.0 | 4.7 | 5.6 | Thin | 11.5GL + 2.0L |
| 775.0 | 2.1 | 1.8 | 4.4 | 2.6 | Terminated | Terminated |

TABLE III-continued

Gelation of 0.7% Terpolymer in Synthetic Seawater with
Methyl p-Hydroxybenzoate and Hexamethylenetetramine
at 200° F., 250° F. and 300° F.

| Temp<br>X-linker<br>Conc* (ppm) | Tongue Length or Gel Length (GL) in Centimeters | | | | | |
|---|---|---|---|---|---|---|
| Aging Time | 200° F. | | 250° F. | | 300° F. | |
| (days) | 2,000 | 3,500 | 2,000 | 3,500 | 2,000 | 3,500 |
| 1022.0 | 2.7 | 1.8 | 3.2 | 2.6 | — | — |

*The numbers given represent the concentration of each crosslinker.
T = Thick, VSG = Very Slight Gel, SG = Slight Gel, S-PG = Slight to Partial Gel, PG = Partial Gel, GL = Gel Length, L = the height of liquid separated from the gel, measured when ampule was at vertical position.

The results shown in Table III show that substantially stronger (i.e. shorter tongue lengths) gels were obtained, when compared with the results of Table I or II. Table III also shows that the composition containing 2,000 ppm each of methyl p-hydroxybenzoate and hexamethylenetetramine did not form strong (short tongue length) gels until after aging for over 550 days at 200° F. or over 71 days at 250° F. However, the results show that some syneresis occurred at 300° F. The results in Table III further demonstrate that HMTA and methyl p-hydroxybenzoate are effective crosslinking agents suitable for high temperature application to form strong gels and to delay gelling.

EXAMPLE IV

This example shows that excellent gels are formed by a composition containing an acrylamide-containing polymer, phenyl acetate and formaldehyde.

The runs were carried out the same as those described in Example I except that phenyl acetate was used in place of phenol and that only one concentration (1,000 ppm) of each crosslinker was used. the results are shown in Table IV.

TABLE IV

Gelation of 0.7% Terpolymer in Synthetic Seawater with
1,000 ppm each of Phenyl Acetate and Formaldehyde
at 200° F., 250° F. and 300° F.

| Aging Time | Tongue Length or Gel Length (GL) in Centimeters | | |
|---|---|---|---|
| (days) | 200° F. | 250°F. | 300° F. |
| 0.2 | T | T | T |
| 0.9 | T | T | T |
| 1.2 | T | T | T |
| 1.9 | T | T | T |
| 4.9 | T | T | 2.4 |
| 6.2 | T | T | 1.1 |
| 9.1 | T | T | 0.4 |

TABLE IV-continued

Gelation of 0.7% Terpolymer in Synthetic Seawater with
1,000 ppm each of Phenyl Acetate and Formaldehyde
at 200° F., 250° F. and 300° F.

| Aging Time | Tongue Length or Gel Length (GL) in Centimeters | | |
|---|---|---|---|
| (days) | 200° F. | 250°F. | 300° F. |
| 15.1 | T | S-PG | 0.6 |
| 20.1 | T | 3.1 | 0.5 |
| 37.0 | T | 0.0 | 0.8 |
| 47.0 | T | 0.0 | 0.9 |
| 54.0 | T | 0.0 | 0.8 |
| 98.0 | Thin | 0.0 | 0.8 |
| 210.0 | 1.7 | 0.0 | 0.7 |
| 279.0 | 3.5 | 0.0 | 1.0 |
| 481.0 | 5.5 | 0.0 | 4.2 + 0.3L |
| 706.0 | 10.0GL | 0.0 | — |
| 950.0 | 9.7GL | 0.0 | — |

T = Thick, SG-PG = Slight to Partial Gel, GL = Gel Length, L = the height of liquid separate from gel, measured when ampule was at vertical position.

Again, Table IV shows that strong gels were formed with the inventive composition, even at very low (1,000 ppm) concentration of crosslinkers. For example, a 100% gel (i.e. 0.0 tongue length) was formed after over 20 days of aging at 250° F.

EXAMPLE V

This example illustrates an inventive gelable composition comprising an acrylamide-containing terpolymer, salicylic acid and HMTA forms strong gels.

The runs were carried out the same as Example III except that methyl p-hydroxybenzoate was replaced by salicylic acid. The results shown in Table V again demonstrate that the inventive composition containing 2,000 ppm each of crosslinkers delayed gelling until after the composition was aged for over 31 days, and a very strong gel (0.7 tongue length) was formed after over 157 days at 250° F.

TABLE V

Gelation of 0.7% Terpolymer in Synthetic Seawater with
Salicylic Acid and Hexamethylenetetramine
at 200° F., 250° F. and 300° F.

| Temp<br>X-linker<br>Conc* (ppm) | Tongue Length or Gel Length (GL) in Centimeters | | | | | |
|---|---|---|---|---|---|---|
| Aging Time | 200° F. | | 250° F. | | 300° F. | |
| (days) | 2,000 | 3,500 | 2,000 | 3,500 | 2,000 | 3,500 |
| 0.3 | T | T | T | T | T | T |
| 0.8 | T | T | T | T | T | VT |
| 1.0 | T | T | T | T | T | VT |
| 1.2 | T | T | T | T | T | VT |
| 1.8 | T | T | T | T | T | VT |
| 2.2 | T | T | T | T | VSG | VSG |
| 2.8 | T | T | T | T | VSG-SG | VSG-SG |
| 3.1 | T | T | T | T | S-PG | S-PG |
| 5.9 | T | T | T | T | 6.6 | 12.0 |

TABLE V-continued

Gelation of 0.7% Terpolymer in Synthetic Seawater with
Salicylic Acid and Hexamethylenetetramine
at 200° F., 250° F. and 300° F.

| Temp X-linker Conc* (ppm) Aging Time (days) | Tongue Length or Gel Length (GL) in Centimeters | | | | | |
|---|---|---|---|---|---|---|
| | 200° F. | | 250° F. | | 300° F. | |
| | 2,000 | 3,500 | 2,000 | 3,500 | 2,000 | 3,500 |
| 8.9 | T | T | T | T | 4.5 | 4.5 |
| 13.8 | T | T | T | T | 3.9 | 1.7 |
| 16.9 | T | T | T | T | 3.5 | 1.8 |
| 23.9 | T | T | T | T | 10.8 | 2.5 |
| 31.0 | Thin | T | T | VSG | 11.0 | 2.8 |
| 62.0 | Thin | T | 6.2 | 18.7 | 6.8 | 4.7 |
| 91.0 | Thin | T | 2.9 | 12.2 | 12.8 | 3.4 |
| 112.0 | Thin | T | 2.3 | 6.3 | 12.8 | 3.6 |
| 122.0 | Thin | T | 2.1 | 4.0 | 13.6 | 3.5 |
| 157.0 | T | VT | 1.5 | 3.6 | 14.8 | 3.5 |
| 281.0 | NG | VT | 0.7 | 2.0 | 19.0GL | 9.5 |
| 384.0 | NG | VT | 0.6 | 2.3 | BG | 6.5 |
| 582.0 | VSG | VT | 0.6 | 1.9 | BG | 11.5 |
| 770.0 | 11.5 | 14.5 | 0.5 | 2.1 | Terminated | 11.5 |
| 1024.0 | 6.0 | 14.1 + 0.3L | 0.5 | 2.2 | | 12.2 |

*The numbers given represent the concentration of each crosslinker.
T = Thick, VT = Very Thick, VSG = Very Slight Gel, BG = Broken Gel, S-PG = Slight to Partial Gel, VSG-SG = Very Slight Gel to Slight Gel, GL = Gel Length, L = the height of liquid separated from the gel, measured when ampule was at vertical position.

Again, the results shown in Table V demonstrate that gelation of the polymer was delayed and strong gels were formed, even at 300° F. (3,500 ppm concentration).

EXAMPLES VI-X

These examples further illustrate inventive gelable composition comprising an acrylamide-containing terpolymer and proper crosslinking compounds also form strong gels.

The runs were carried out the same as those described in Example I except that the crosslinkers and their concentrations in Example I were replaced by those shown in Tables VI-X. As shown in Tables VI-X, some of the inventive compositions did not gel until after the compositions had been aged at high temperatures for months and eventually formed strong (short tongue length) gels, especially those comprising phenyl acetate and HMTA (Table VIII), and phenyl salicylate and HMTA (Table X), at 250° F., formed gels having 0 cm tongue length.

TABLE VI

Gelation of 0.7% Terpolymer in Synthetic Seawater with
Aspirin and Hexamethylenetetramine
at 200° F., 250° F. and 300° F.

| Temp X-linker Conc* (ppm) Aging Time (days) | Tongue Length or Gel Length (GL) in Centimeters | | | | | |
|---|---|---|---|---|---|---|
| | 200° F. | | 250° F. | | 300° F. | |
| | 2,000 | 3,500 | 2,000 | 3,500 | 2,000 | 3,500 |
| 0.2 | T | T | T | T | T | T |
| 0.8 | T | T | T | T | T | T |
| 1.0 | T | T | T | T | T | T |
| 1.2 | T | T | T | T | T | T |
| 3.2 | T | T | T | VT | T | T |
| 3.8 | T | T | T | VT | T | VSG |
| 4.8 | T | T | T | T | S-PG | S-PG |
| 7.9 | T | T | T | T | VSG | VSG |
| 15.0 | T | T | T | T | VSG | VSG |
| 47.0 | T | T | 18.0 | PG | VSG | VSG |
| 57.0 | T | T | 13.6 | 16.5 | VSG | VSG |
| 75.0 | Thin | Thin | 5.6 | 6.9 | VSG-SG | 5.5GL + 5.0L |
| 96.0 | Thin | Thin | 4.0 | 4.4 | VSG-SG | 4.6GL + 5.6L |
| 106.0 | Thin | Thin | 3.4 | 3.2 | VSG-SG | 5.5GL + 5.0L |
| 141.0 | Thin | Thin | 3.4 | 2.6 | VSG-SG | 4.9GL + 5.0L |
| 369.0 | Thin | NG | 2.3 | 1.9 | Thin | 3.3GL + 5.2L |
| 536.0 | Thin | S-PG | 1.7 | 1.7 | Thin | 2.9GL + 5.3L |
| 762.0 | Thin | 13.2 | 2.2 | 2.3 | Terminated | 2.5GL + 4.5L |
| 1008.0 | Terminated | 5.3 | 1.5 | 1.7 | — | 2.4GL + 4.5L |

*The numbers given represent the concentration of each crosslinker.
T = Thick, VT = Very Thick, VSG = Very Slight Gel, S-PG = Slight to Partial Gel, NG = No Gel, PG = Partial Gel, L = the height of liquid separated from the gel, measured when ampule was at vertical position.

TABLE VII

Gelation of 0.7% Terpolymer in Synthetic Seawater with 1,000 ppm each of Phenyl Salicylate and Formaldehyde at 200° F., 250° F. and 300° F.

| Aging Time | Tongue Length in Centimeters | | |
|---|---|---|---|
| (days) | 200° F. | 250°F. | 300° F. |
| 0.2 | NG | NG | NG |
| 0.8 | NG | NG | NG |
| 1.0 | NG | NG | NG |
| 1.2 | T | NG | NG |
| 1.9 | T | NG | NG |
| 2.9 | T | NG | SG |
| 3.2 | T | NG | PG |
| 6.0 | T | NG | 4.5 |
| 10.0 | T | NG | 3.1 |
| 17.0 | T | S-PG | 2.5 |
| 24.0 | T | 15.2 | 2.6 |
| 29.0 | T | 8.7 | 2.5 |
| 42.0 | NG | 5.5 | 4.9 |
| 55.0 | NG | 4.8 | 10.6 |
| 83.0 | NG | 3.2 | 15.1 |
| 146.0 | VSG | 2.6 | * |
| 261.0 | PG | 2.6 | — |
| 324.0 | 17.9 | 2.8 | — |
| 367.0 | 17.1 | 2.9 | — |
| 416.0 | 16.5 | 2.9 | — |
| 574.0 | 14.2 | 3.3 | — |
| 680.0 | 12.3 | 3.3 | — |
| 1070.0 | 13.7 | 5.6 | — |

T = Thick, NG = No Gel, VSG = Very Slight Gel, S-PG = Slight to Partial Gel, PG = Partial Gel.
*Ampule was broken accidentally.

TABLE VIII

Gelation of 0.7% Terpolymer in Synthetic Seawater with Phenyl Acetate and Hexamethylenetetramine at 200° F., 250° F. and 300° F.

| Temp | 200° F. | | 250° F. | | 300° F. | |
|---|---|---|---|---|---|---|
| X-linker Conc* (ppm) Aging Time (days) | 2,000 | 3,500 | 2,000 | 3,500 | 2,000 | 3,500 |
| 0.2 | NG | T | T | T | VSG | VSG |
| 0.9 | T | T | T | T | VSG | VSG |
| 1.2 | T | T | VSG | VSG | VSG | VSG |
| 3.9 | VSG | VT | VSG | T | VSG | S-PG |
| 7.9 | VSG | VSG | VSG | T | VSG | 7.2 |
| 11.2 | VSG | VSG | VSG | T | S-PG | 5.2 |
| 15.0 | VSG-SG | VSG | VSG | T | S-PG | 4.0 |
| 18.9 | VSG-SG | VSG | VSG | VSG | PG | 3.0 |
| 77.0 | S-PG | S-PG | PG | 1.7 | 6.9 | 2.0 |
| 127.0 | S-PG | PG + 0.5L | 3.8 | 0.0 | 7.5 | 0.0 |
| 153.0 | PG | PG + 0.8L | 2.8 | 0.0 | 15.8 | 3.5 |
| 197.0 | PG | 13.5GL + 1.1L | 1.8 | 0.2 | 17.5GL | 3.2 |
| 246.0 | PG | 12.9GL + 1.8L | 1.8 | 0.2 | 17.5GL | 3.8 |
| 298.0 | 12.0GL + 2.3L | 13.1GL + 1.5L | 1.3 | 0.0 | PG | 4.6 |
| 405.0 | 14.0GL + 1.8L | 11.7GL + 1.8L | 1.5 | 0.0 | SG | 11.5 |
| 510.0 | 14.0GL + 2.1L | 10.7GL + 1.6L | 1.2 | 0.0 | Terminated | 13.0 + 0.2L |
| 677.0 | 14.0GL + 2.2L | 3.5GL + 1.8L | 1.7 | 0.0 | — | PG |
| 898.0 | 11.1GL + 2.1L | 2.9 | 2.5 | 0.0 | — | BG |
| 1142.0 | 6.1 + 2.1L | 2.6 | 3.1 | 0.0 | — | Terminated |

*The numbers given represent the concentration of each crosslinker.
T = Thick, VT = Very Thick, VSG = Very Slight Gel, S-P = Slight to Partial Gel, PG = Partial Gel, BG = Broken Gel, GL = Gel Length, L = the height of liquid separated from the gel, measured when ampule was at vertical position.

TABLE IX

Gelation of 0.7% Terpolymer in Synthetic Seawater with 4-Aminosalicylic Acid and Hexamethylenetetramine at at 200° F., 250° F. and 300° F.

| Temp | 200° F. | | 250° F. | | 300° F. | |
|---|---|---|---|---|---|---|
| X-linker Conc* (ppm) Aging Time (days) | 2,000 | 3,500 | 2,000 | 3,500 | 2,000 | 3,500 |
| 0.2 | 6.9 | 13.2 | 4.7 | 4.0 | 5.6 | 5.1 |
| 0.8 | 3.9 | 3.6 | 6.0 | 4.9 | 8.1 | 8.0 |
| 1.2 | 4.0 | 3.8 | 5.0 | 5.1 | 7.5 | 7.8 |
| 2.0 | 4.0 | 3.6 | 6.0 | 5.8 | 13.5 | 8.5 |
| 4.9 | 4.o | 3.7 | 6.8 | 6.4 | 10.8 | 12.9 |
| 5.9 | 4.7 | 4.4 | 6.8 | 10.3 | 12.3 | 5.2 |
| 12.0 | 3.8 | 6.0 | 6.5 | 10.6 | 14.4 | 12.1 |
| 19.0 | 4.2 | 4.0 | 6.7 | 7.3 | 14.9 | 13.2 |
| 47.0 | 6.3 | 5.7 | 11.1 | 7.5 | PG | PG |
| 75.0 | 5.2 | 9.4 | 8.4 | 7.2 | PG + 3.7L | PG + 3.5L |
| 138.0 | 6.5 | 8.8 | 10.8 | 6.3 | — | — |
| 239.0 | 4.2 | 3.7 | 5.7 | 7.3 | Terminated | Terminated |
| 316.0 | 4.8 | 3.4 | 8.7 | 4.7 | — | — |
| 359.0 | 4.3 | 3.9 | 12.5 | 4.8 | — | — |
| 391.0 | 4.4 | 7.8 | 7.8GL + 1.0L | 7.3 | — | — |

TABLE IX-continued

Gelation of 0.7% Terpolymer in Synthetic Seawater with
4-Aminosalicylic Acid and Hexamethylenetetramine at
at 200° F., 250° F. and 300° F.

| Temp X-linker Conc* (ppm) Aging Time (days) | 200° F. | | 250° F. | | 300° F. | |
|---|---|---|---|---|---|---|
| | 2,000 | 3,500 | 2,000 | 3,500 | 2,000 | 3,500 |
| 408.0 | 6.4 | 7.9 | 10.7GL + 1.6L | 7.2 | — | — |
| 566.0 | 4.2 | 6.7 | 6.8GL + 2.1L | 8.7 + 0.1L | — | — |
| 672.0 | 4.4 | 4.0 | 6.7GL + 2.2L | 9.0 + 0.1L | — | — |
| 884.0 | 6.1 | 7.7 | 6.8GL + 2.3L | 2.6 + 0.1L | — | — |

*The numbers given represent the concentration of each crosslinker.
PG = Partial Gel, L = the height of liquid separated from the gel, measured when ampule was at vertical position.

TABLE X

Gelation of 0.7% Terpolymer in Synthetic Seawater with
Phenyl Salicylate and Hexamethylenetetramine
at 200° F., 250° F. and 300° F.

| Temp X-linker Conc* (ppm) Aging Time (days) | 200° F. | | 250° F. | | 300° F. | |
|---|---|---|---|---|---|---|
| | 2,000 | 3,500 | 2,000 | 3,500 | 2,000 | 3,500 |
| 0.2 | NG | NG | NG | NG | NG | NG |
| 0.9 | NG | NG | NG | NG | VSG | VSG |
| 1.1 | NG | NG | NG | NG | VSG | VSG |
| 1.9 | NG | NG | NG | NG | VSG-SG | VSG-SG |
| 4.9 | T | T | NG | NG | 7.7 | 7.8 |
| 8.9 | T | VSG | T | T | 4.5 | 4.1 |
| 12.2 | T | VSG | T | T | 4.o | 3.4 |
| 16.0 | T | VSG | NG | NG | 3.5 | 1.7 |
| 19.9 | T | VSG | NG | NG | 3.0 | 0.9 |
| 77.0 | T | VSG | 4.8 | 2.7 | 10.1 | 1.9 |
| 128.0 | VSG | VSG | 1.9 | 0.0 | 3.6 | 0.0 |
| 162.0 | VSG | VSG | 1.4 | 0.0 | 11.1 | 4.5 |
| 198.0 | VSG | VSG | 1.3 | 0.3 | 11.1 | 1.8 |
| 247.0 | VSG-SG | S-PG | 1.1 | 0.4 | 12.2 | 2.2 |
| 299.0 | VSG-SG | S-PG | 0.6 | 0.0 | 12.9 | 2.1 |
| 406.0 | NG | NG | 0.6 | 0.0 | 15.8 | 2.1 |
| 511.0 | SG | S-PG | 1.0 | 0.0 | PG | 3.3 |
| 678.0 | SG | S-PG | 0.9 | 0.0 | BG | 3.6 + 0.4L |
| 899.0 | SG | SG | 1.1 | 0.0 | Terminated | 8.9 + 0.4L |
| 1142.0 | Terminated | Terminated | 1.5 | 0.0 | Terminated | 9.5 |

*The number given represent the approximate concentration of each crosslinker.
T = Thick, VT = Very Thick, NG = No Gel, VSG = Very Slight Gel, VSG—SG = Very Slight Gel to Slight Gel, BG = Broken Gel, S-PG = Slight to Partial Gel, PG = Partial Gel, L = the height of liquid separated from the gel, measured when ampule was at vertical position.

EXAMPLE XI

This example illustrates that glyoxal, a formaldehyde precursor that release formaldehyde upon heating, is not a suitable crosslinking agent.

The runs were carried out the same as those described in Example I except that glyoxal was used in place of formaldehyde. The results shown in Table XI below indicate that little nor no gels were formed. It is concluded that an aldehyde precursor that generates formaldehyde in-situ is not necessary a crosslinking agent.

TABLE XI

Gelation of 0.7% Terpolymer in Synthetic Seawater with
Phenol and Glyoxal at 200° F., 250° F. and 300° F.

| X-linker Conc* (ppm) Aging Time (days) | 200° F. | | 250° F. | | 300° F. | |
|---|---|---|---|---|---|---|
| | 2,000 | 3,500 | 2,000 | 3,500 | 2,000 | 3,500 |
| 0.2 | VT | VT | T | T | T | T |
| 0.9 | T | VT | T | T | NG | NG |
| 1.1 | T | T | T | T | NG | NG |
| 1.3 | T | T | T | T | NG | NG |
| 4.0 | T | T | T | VSG | NG | NG |
| 6.0 | T | T | NG | VSG | NG | NG |
| 8.0 | T | T | NG | VSG | NG | NG |
| 12.0 | T | T | NG | VSG | NG | NG |
| 15.0 | T | VT | NG | VSG | NG | NG |
| 19.0 | T | T | NG | VSG | NG | NG |

TABLE XI-continued

Gelation of 0.7% Terpolymer in Synthetic Seawater with
Phenol and Glyoxal at 200° F., 250° F. and 300° F.

| X-linker Conc* (ppm) Aging Time (days) | 200° F. 2,000 | 200° F. 3,500 | 250° F. 2,000 | 250° F. 3,500 | 300° F. 2,000 | 300° F. 3,500 |
|---|---|---|---|---|---|---|
| 32.0 | NG | NG | NG | VSG | NG | NG |
| 50.0 | NG | NG | NG | VSG | NG | NG |
| 99.0 | NG | VSG | NG | VSG | NG | NG |
| 203.0 | Terminated | S-PG | Terminated | VSG | Terminated | Terminated |
| 277.0 | — | S-PG | — | VSG | — | — |
| 323.0 | — | PG + 0.5L | — | Terminated | — | — |
| 372.0 | — | PG + 0.3L | — | — | — | — |
| 424.0 | — | PG + 0.3L | — | — | — | — |
| 530.0 | — | PG + 0.3L | — | — | — | — |
| 635.0 | — | PG + 0.2L | — | — | — | — |
| 862.0 | — | PG + 0.2L | — | — | — | — |
| 1033.0 | — | PG + 0.2L | — | — | — | — |
| 1267.0 | — | S-PG + 0.2L | — | — | — | — |

*The numbers given represent the concentration of each crosslinker.
T = Thick, VT = Very Thick, NG = No Gel, VSG = Very Slight Gel, PG = Partial Gel, S-PG = Slight to Partial Gel.
L = the height of liquid separated from the gel, measured when ampule was at vertical position.

EXAMPLE XII

This example further demonstrates that 1,3,5-trioxane, another formaldehyde precursor which generates formaldehyde upon heating, produces gels with measurable tongue lengths only after a long period of time.

The runs were carried out the same as those described in Example XI except that 1,3,5-trioxane was used in place of glyoxal. The results presented in Table XII below show that, using phenol and trioxane as crosslinkers, gels with measurable tongue lengths did not appear until after over 6 months of aging at 250° F., either at 2,000 ppm or 5,000 ppm. The system did not produce any gel at 200° F. in the period shown in the Table, but this system might have limited application at 250° F. This system was not tested at 300° F.

TABLE XII

Gelation of 0.7% Terpolymer In Synthetic Seawater with
Phenol and 1,3,5-Trioxane at 200° F. and 250° F.

| Temp X-linker Conc* (ppm) Aging Time (days) | 200° F. 2,000 | 200° F. 5,000 | 250° F. 2,000 | 250° F. 5,000 |
|---|---|---|---|---|
| 0.05 | NG | NG | NG | NG |
| 0.10 | NG | NG | NG | NG |
| 0.18 | NG | T | NG | NG |
| 0.26 | NG | T | NG | NG |
| 1.2 | NG | T | NG | NG |
| 2.9 | NG | T | NG | NG |
| 4.1 | NG | NG | NG | NG |
| 5.3 | NG | NG | NG | NG |
| 10.9 | NG | T | NG | NG |
| 19.2 | NG | NG | NG | NG |
| 34.0 | NG | T | NG | NG |
| 52.0 | NG | NG | NG | NG |
| 199.0 | NG | NG | S-PG | PG |
| 259.0 | NG | NG | 17.0GL | 15.3 |
| 433.0 | NG | NG | 2.2 | 7.2 |
| 664.0 | Terminated | Terminated | 2.3 | 7.8 |

T = Thick, NG = No Gel, PG = Partial Gel, S-PG = slight to Partial Gel.
GL = Gel Length, L = the height of liquid separated from the gel, measured when ampule was at vertical position.

EXAMPLES XIII-XVI

These examples show that glyoxal, when used with phenyl acetate which is a hidden phenolic disclosed in U.S. Pat. No. 4,926,943 as well as with other crosslinking agent, did not form satisfactory gels.

The runs were carried out the same as those described in Example XI except that phenyl acetate, a hidden phenolic disclosed in U.S. Pat. No. 4,926,943, as well as other crosslinking agents noted in Tables XIII-XVI, was used in place of phenol. The results shown in Table XIII indicate that after aging for 950 days, no satisfactory gels were produced under the conditions shown in Table XIII. Similar to the results presented in Table XIII, the results shown in Tables XIV-XVI clearly indicate that glyoxal is not a satisfactory aldehyde precursor for use in a gelling mixture.

TABLE XIII

Gelation of 0.7% Terpolymer in Synthetic Seawater with Phenyl
Acetate and Glyoxal at 200° F., 250° F. and 300° F.

| Temp X-linker Conc* (ppm) Aging Time (days) | 200° F. 2,000 | 200° F. 3,500 | 250° F. 2,000 | 250° F. 3,500 | 300° F. 2,000 | 300° F. 3,500 |
|---|---|---|---|---|---|---|
| 0.2 | T | VT | T | T | T | T |
| 0.9 | T | VT | T | VT | T | VSG |
| 1.2 | T | VT | T | VSG | T | VSG |
| 1.9 | T | VT | Thin | VSG | Thin | VSG |
| 4.9 | T | VT | T | VSG | Thin | VSG |
| 6.2 | T | VT | Thin | VSG | Thin | VSG |
| 9.1 | T | VT | Thin | SG | Thin | VSG |
| 15.1 | T | VT | Thin | VSG-SG | T | VSG |
| 20.1 | T | VSG | Thin | VSG-SG | T | T |
| 37.0 | T | S-PG | Thin | S-PG | T | T |
| 47.0 | T | S-PG | Thin | S-PG | Thin | T |
| 54.0 | T | S-PG | Thin | S-PG | Thin | Thin |
| 210.0 | NG | T | NG | NG | NG | NG |
| 279.0 | NG | S-PG | Thin | NSG | Thin | Thin |
| 481.0 | VSG | S-PG | Thin | Thin | Thin | Thin |
| 706.0 | VSG | SG | Thin | Thin | Thin | Thin |
| 950.0 | VSG | SG | Thin | Thin | Thin | Thin |

*The numbers given represent the concentration of each crosslinker.
T = Thick, VT = Very thick, VSG = Very Slight Gel, NG = No Gel, S-PC = Slight to Partial Gel.

TABLE XIV

Gelation of 0.7% Terpolymer in Synthetic Seawater with Salicylic Acid and Glyoxel at 200° F., 250° F. and 300° F.

| Temp X-linker Conc* (ppm) Aging Time (days) | Tongue Length in Centimeters | | | | | |
|---|---|---|---|---|---|---|
| | 200° F. | | 250° F. | | 300° F. | |
| | 2,000 | 3,500 | 2,000 | 3,500 | 2,000 | 3,500 |
| 0.2 | T | T | T | T | T | T |
| 0.9 | T | T | T | T | T | T |
| 1.2 | T | T | T | T | T | T |
| 1.9 | T | T | T | VSG | Thin | T |
| 2.2 | T | T | T | VSG | Thin | T |
| 3.2 | T | T | Thin | VSG | Thin | T |
| 3.9 | T | T | T | VSG | Thin | VSG |
| 9.2 | T | T | Thin | VSG | Thin | T |
| 15.1 | T | VT | Thin | VSG | Thin | T |
| 32.0 | T | VSG | Thin | VSG | Thin | T |
| 42.0 | T | VSG | Thin | VSG | Thin | T |
| 49.0 | T | VSG-SG | Thin | VSG | Thin | T |
| 205.0 | NG | T | NG | NG | NG | NG |
| 274.0 | NG | VSG | Thin | Thin | Thin | Thin |
| 476.0 | NG | VSG | Thin | Thin | Thin | Thin |
| 711.0 | NG | VSG | Thin | Thin | Thin | Thin |

*The numbers given represent the concentration of each crosslinker.
T = Thick, VT = Very thick, VSG = Very Slight Gel, NG = No Gel, VSG-SG = Very Slight Gel to Slight Gel.

TABLE XV

Gelation of 0.7% Terpolyner In Synthetic Seawater with Aspirin and Glyoxal at 200° F., 250° F. and 300° F.

| Temp X-linker Conc* (ppm) Aging Time (days) | Tongue Length in Centimeters | | | | | |
|---|---|---|---|---|---|---|
| | 200° F. | | 250° F. | | 300° F. | |
| | 2,000 | 3,500 | 2,000 | 3,500 | 2,000 | 3,500 |
| 0.2 | T | T | T | T | T | T |
| 0.9 | T | T | T | T | T | VSG |
| 1.0 | T | T | T | T | T | vsc |
| 1.2 | T | T | T | T | T | vsc |
| 2.9 | T | T | T | VSG | T | VSG |
| 3.9 | T | T | T | VSG | T | VSG |
| 5.9 | T | T | T | VSG | T | VSG |
| 12.1 | T | VT | T | VSG | T | T |
| 28.9 | T | VT | T | VSG | Thin | T |
| 39.0 | T | VSG | Thin | VSG-SG | Thin | T |
| 46.0 | T | VSG-SG | T | VSG-SG | Thin | T |
| 271.0 | VSG | S-PG | Thick | Thick | Thin | Thin |
| 473.0 | Thick | SG | Thin | Thin | Thin | Thin |
| 944.0 | VSG | VSG-SG | Thin | Thin | Thin | Thin |

*The numbers given represent the concentration of each crosslinker.
T = Thick, VT = Very thick, VSG = Very Slight Gel, VSG-SG = Very Slight Gel to Slight Gel, SG = Slight Gel, S-PG = Slight to Partial Gel.

TABLE XVI

Gelation of 0.7% Terpolymer In Synthetic Seawater with Methyl P-Hydroxybenzoate and Glyoxal at 200° F., 250° F. and 300° F.

| Temp X-linker Conc* (ppm) Aging Time (days) | Tongue Length in Centimeters | | | | | |
|---|---|---|---|---|---|---|
| | 200° F. | | 250° F. | | 300° F. | |
| | 2,000 | 3,500 | 2,000 | 3,500 | 2,000 | 3,500 |
| 0.2 | VT | VT | T | T | T | T |
| 0.9 | VT | VT | T | T | Thin | Thin |
| 1.2 | VT | VT | T | T | Thin | VSG |
| 3.9 | VT | VT | T | VSG | Thin | VSG |
| 4.9 | T | VT | VSG | VSG | Thin | VSG |
| 7.9 | T | T | Thin | VSG | Thin | VSG |
| 11.1 | T | T | Thin | VSG-SG | Thin | T |
| 13.1 | T | T | Thin | PG | Thin | Thin |
| 15.1 | T | T | Thin | VSG | Thin | Thin |
| 26.0 | T | VSG | T | VSG-SG | Thin | Thin |
| 43.0 | T | SG | T | SG | Thin | Thin |
| 53.0 | T | SG | T | SG | Thin | Thin |
| 60.0 | T | SG | T | VSG-SG | Thin | Thin |
| 104.0 | T | VSG | T | — | — | — |
| 285.0 | VSG | SG | Thin | VSG | Thin | Thin |
| 487.0 | VSG | SG | Thin | VSG | Thin | Thin |
| 722.0 | VSG | SG | Thin | Thin | Thin | Thin |
| 958.0 | — | S-PG | — | Thin | — | — |

*The numbers given represent the concentration of each crosslinker.
T = Thick, VT = Very thick, PG = Partial Gel, SG = Slight Gel, VSG = Very Slight Gel, S-PG = Slight to Partial Gel.

EXAMPLE XVII

This example demonstrates that the invention composition comprising hexamethylenetetramine forms satisfactory gels.

The runs were carried out the same as those described in Example XIII except that hexamethylenetetramine was used in place of glyoxal. The results are shown in Table XVII which demonstrates that excellent gels were formed.

TABLE XVII

Gelation of 0.7% Terpolymer in Synthetic Seawater with Phenyl Acetate and Nexamethylenotatramine at 200° F., 250° F. and 300° F.

| Temp X-linker Conc* (ppm) Aging Time (days) | Tongue Length of Gel Length (GL) in Centimeters | | | | | |
|---|---|---|---|---|---|---|
| | 200° F. | | 250° F. | | 300° F. | |
| | 2,000 | 3,500 | 2,000 | 3,500 | 2,000 | 3,500 |
| 0.2 | NG | T | T | T | VSG | VSG |
| 0.9 | T | T | T | T | VSG | VSG |
| 1.2 | T | T | VSG | VSG | VSG | VSG |
| 3.9 | VSG | VT | VSG | T | VSG | S-PG |
| 7.9 | VSG | VSG | VSG | T | VSG | 7.2 |
| 11.2 | VSG | VSG | VSG | T | S-PG | 5.2 |
| 15.0 | VSG-SG | VSG | VSG | T | S-PG | 4.0 |
| 18.9 | VSG-SG | VSG | VSG | VSG | PG | 3.0 |
| 77.0 | S-PG | S-PG | PG | 1.7 | 6.9 | 2.0 |
| 127.0 | S-PG | PG + 0.5L | 3.8 | 0.0 | 7.5 | 0.0 |
| 153.0 | PG | PG + 0.8L | 2.8 | 0.0 | 15.8 | 3.S |
| 197.0 | PG | 13.5GL + 0.1L | 1.8 | 0.2 | 17.5GL | 3.2 |
| 246.0 | PC | 12.9GL + 1.8L | 1.8 | 0.2 | 17.5GL | 3.8 |
| 298.0 | 12.0GL + 2.3L | 13.1GL + 1.5L | 1.3 | 0.0 | PG | 4.6 |

TABLE XVII-continued

Gelation of 0.7% Terpolymer in Synthetic Seawater with Phenyl Acetate and Nexamethylenotatramine at 200° F., 250° F. and 300° F.

| Temp X-linker Conc* (ppm) Aging Time (days) | Tongue Length of Gel Length (GL) in Centimeters | | | | | |
|---|---|---|---|---|---|---|
| | 200° F. | | 250° F. | | 300° F. | |
| | 2,000 | 3,500 | 2,000 | 3,500 | 2,000 | 3,500 |
| 405.0 | 14.0GL + 1.8L | 11.7GL + 1.8L | 1.5 | 0.0 | SG | 11.5 |
| 510 | 14.0GL + 2.1L | 10.7GL + 1.6L | 1.2 | 0.0 | — | 13.0 + 0.2L |
| 677 | 14.0GL + 2.2L | 6.5GL + 1.82 | 1.7 | 0.0 | — | PG |
| 898 | 11.1GL + 2.0L | 2.9 | 2.5 | 0.0 | — | GL + Water |
| 1142 | 6.1GL + 2.0L | 2.6 | 3.1 | 0.0 | — | — |

*The numbers given represent the concentration of each crosslinker.
T = Thick, VT = Very thick, VSG = Very Slight Gel, NG = No Gel, S-PG = Slight to Partial Gel, PG = Partial Gel, GL = Gel Length, L = the height of liquid separate from the gel.

Although wishing not to be bound by theory, hexamethylenetetramine is probably converted to formaldehyde and ammonia upon heating. The in-situ produced formaldehyde is then coupled with a crosslinking agent to form gels with an acrylamide-containing polymer. However, glyoxal or trioxane, which is also converted to formaldehyde upon heating, does not form suitable gels with a crosslinking agent and an acrylamide-containing polymer (Tables XI and XIII-XVI). The strong and stable gels formed by hexamethylenetetramine and phenol (Table II) as well as by hexamethylenetetramine and other crosslinking agents (Tables III, V, VI, VIII, IX, X, and XVII), therefore, represent unexpected and surprising results.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the specification and the claims.

That which is claimed is:

1. A composition comprising: (1) a water dispersible crosslinking compound selected from the group consisting of p-aminosalicylic acid, RArOC(O)R' and HOArC(O)OR", and combinations thereof; wherein Ar represents a phenyl group which can be non-substituted or substituted; R is hydrogen or a carboxylic group; R' is a $C_1-C_6$ alkyl; R" is hydrogen, a phenyl group, or a $C_1-C_6$ alkyl; and when R is a carboxylic group, R and C(O)OR" can be at ortho, meta, or para position with respect to the OC(O)R' group and the OH group, respectively; (2) hexamethylenetetramine; (3) a water soluble acrylamide-containing polymer; and (4) water.

2. A composition according to claim 1 wherein said crosslinking compound is selected from the group consisting of p-aminosalicylic acid, phenyl acetate, phenyl propionate, phenyl butyrate, salicylic acid, phenyl salicylate, p-hydroxybenzoic acid, methyl p-hydroxybenzoate, ethyl p-hydroxybenzoate, hexyl p-hydroxybenzoate, methyl o-hydroxybenzoate, and mixtures thereof.

3. A composition according to claim 2 wherein said crosslinking compound is phenyl acetate.

4. A composition according to claim 2 wherein said crosslinking compound is phenyl salicylate.

5. A composition according to claim 2 wherein said crosslinking compound is methyl p-hydroxybenzoate.

6. A composition according to claim 1 wherein said crosslinking compound is present in the composition in the range of from about 0.005 to about 5.0 weight %.

7. A composition according to claim 6 wherein said crosslinking compound is present in the composition in the range of from about 0.01 to about 2.0 weight %.

8. A composition according to claim 7 wherein said crosslinking compound is present in the composition in the range of from 0.03 to 1.0 weight %.

9. A composition according to claim 1 wherein said hexamethylenetetramine is present in the composition in the range of from about 0.005 to about 5.0 weight %.

10. A composition according to claim 9 wherein said hexamethylenetetramine is present in the composition in the range of from about 0.01 to about 2.0 weight %.

11. A composition according to claim 10 wherein said hexamethylenetetramine is present in the composition in the range of from 0.03 to 1.0 weight %.

12. A composition according to claim 1 wherein said polymer contains from 100 mole % to 5 mole % of a monomer selected from those monomers represented by the following formula:

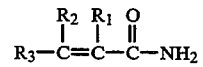

wherein $R_1$, $R_2$, and $R_3$ are independently selected from the group consisting of hydrogen and alkyl groups containing from 1 to 3 carbon atoms; and contains from 0 mole % to 95 mole % of a monomer selected from the group consisting of (a) those monomers which can be represented by the following formula:

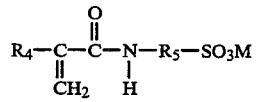

wherein $R_4$ is selected from the group consisting of hydrogen and alkyl radicals containing from 1 to 6 carbon atoms, $R_5$ is selected from the group consisting of alkylene radicals containing from 1 to 6 carbon atoms and arylene radicals containing from 6 to 10 carbon atoms, and M is selected from the group consisting of hydrogen, ammonium potassium, and sodium; and (b) those monomers represented by the following formula:

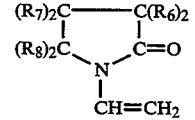

where $R_6$, $R_7$, and $R_8$ are independently selected from the group consisting of hydrogen and alkyl radicals containing from 1 to 2 carbon atoms; and (c) a monomer selected from the group consisting of acrylic acid, sodium acrylate, potassium acrylate, ammonium acrylate, methacrylic acid, sodium methacrylate, potassium methacrylate, ammonium methacrylate, N,N-dimethylacrylamide, vinylsulfonic acid, sodium vinylsulfonate, potassium vinylsulfonate, ammonium vinylsulfonate, vinylbenzylsulfonic acid, sodium vinylbenzylsulfonate, potassium vinylbenzylsulfonate, ammonium vinylbenzylsulfonate, vinylacetate, acrylonitrile, methyl acrylonitrile, vinyl alkyl ether, vinyl chloride, maleic anhydride, vinyl substituted cationic quaternary ammonium compounds, (acryloyloxyethyl)dimethylmethylammonium methyl sulfate, and sodium acrylate; and (d) mixtures thereof.

13. A composition according to claim 12 wherein said polymer is selected from the group consisting of homopolymers of acrylamide, homopolymers of methacrylamide, copolymers of acrylamide and N-vinyl-2-pyrrolidone, copolymers of acrylamide and N,N-dimethylacrylamide, copolymers of acrylamide and methacrylamide, copolymers of acrylamide and acrylic acid, copolymers of acrylamide and sodium acrylate, copolymers of acrylamide and potassium acrylate, copolymers of methacrylamide and acrylic acid, copolymers of acrylamide and N-vinyl-2-pyrrolidone, copolymers of acrylamide and sodium 2-acrylamido-2-methylpropane sulfonate, terpolymers of N-vinyl-2-pyrrolidone, acrylamide and sodium 2-acrylamido-2-methylpropane sulfonate, and terpolymers of acrylamide, N,N-dimethylacrylamide and sodium 2-acrylamido-2-methylpropane sulfonate, and combinations thereof.

14. A composition according to claim 13 wherein said polymer is a terpolymer of N-vinyl-2-pyrrolidone, acrylamide, and sodium 2-acrylamido-2-methylpropanesulfonate.

15. A composition according to claim 1 wherein said polymer is present in the composition in the range of from about 0.05 to about 10 weight %.

16. A composition according to claim 15 wherein said range is from about 0.1 to about 5 weight %.

17. A composition according to claim 16 wherein said range is from 0.2 to 4 weight %.

18. A composition according to claim 1 wherein: said crosslinking compound is selected from the group consisting of p-aminosalicylic acid, phenyl acetate, phenyl propionate, phenyl butyrate, salicylic acid, phenyl salicylate, p-hydroxybenzoic acid, methyl p-hydroxybenzoate, ethyl p-hydroxybenzoate, hexyl p-hydroxybenzoate, methyl o-hydroxybenzoate, and mixtures thereof; and said polymer is selected from the group consisting of homopolymers of acrylamide, homopolymers of methacrylamide, copolymers of acrylamide and N-vinyl-2-pyrrolidone, copolymers of acrylamide and N,N-dimethylacrylamide, copolymers of acrylamide and methacrylamide, copolymers of acrylamide and acrylic acid, copolymers of acrylamide and sodium acrylate, copolymers of acrylamide and potassium acrylate, copolymers of methacrylamide and acrylic acid, terpolymers of N-vinyl-2-pyrrolidone, acrylamide and sodium 2-acrylamido-2-methylpropane sulfonate, and terpolymers of N,N-dimethylacrylamide, acrylamide and sodium 2-acrylamido-2-methylpropane sulfonate, and combinations thereof.

19. A composition according to claim 18 wherein said crosslinking compound is phenyl acetate and said polymer is a terpolymer of N-vinyl-2-pyrrolidone, acrylamide and sodium 2-acrylamido-2-methylpropane sulfonate.

20. A composition according to claim 18 wherein said crosslinking compound is methyl p-hydroxybenzoate and said polymer is a terpolymer of N-vinyl-2-pyrrolidone, acrylamide and sodium 2-acrylamido-2-methylpropane sulfonate.

21. A composition according to claim 18 wherein said crosslinking compound is salicylic acid and said polymer is a terpolymer of N-vinyl-2-pyrrolidone, acrylamide and sodium 2-acrylamido-2-methylpropane sulfonate.

22. A composition according to claim 18 wherein said crosslinking compound is phenyl salicylate and said polymer is a terpolymer of N-vinyl-2-pyrrolidone, acrylamide and sodium 2-acrylamido-2-methylpropane sulfonate.

23. A composition according to claim 1 wherein said crosslinking compound is present in the composition in the range of from about 0.005 to about 5.0 weight %; said hexamethylenetetramine is present in the composition in the range of from about 0.005 to about 5.0 weight %; said polymer is present in the composition in the range of from about 0.05 to about 10 weight %; and said water makes up the rest of said composition 24. A composition according to claim 23 wherein said crosslinking compound is present in the composition in the range of about 0.01 to about 2.0 weight percent; said hexamethylenetetramine is present in the composition in the range of about 0.01 to about 2.0 weight percent; said polymer is present in the composition in the amount of about 0.1 to about 5 weight %; and said water makes up the rest of the composition.

25. A composition according to claim 24 wherein said crosslinking compound is present in the composition in the range of from 0.03 to 1.0 weight %; said hexamethylenetetramine is present in the composition in the range of from 0.03 to 1.0 weight %; said polymer is present in the composition in the range of from 0.2 to 4 weight %; and said water makes up the rest of the composition.

26. A composition according to claim 1 wherein said composition comprises: (1) from 0.03 to 1.0 weight % of methyl p-hydroxybenzoate; (2) from 0.03 to 1.0 weight % of hexamethylenetetramine; (3) from 0.2 to 4 weight % of a terpolymer of monomers consisting of N-vinyl-2-pyrrolidone, acrylamide, and sodium 2-acrylamido-2-methylpropane sulfonate wherein said monomers are provided in a 30:15:55 weight %, respectively; and (4) from 94 to 99.7 weight % of water; wherein said weight % is based on total weight of said composition.

27. A composition according to claim 1 wherein said composition comprises: (1) from 0.03 to 1.0 weight % of phenyl acetate; (2) from 0.03 to 1.0 weight % of hexamethylenetetramine; (3) from 0.2 to 4 weight % of a terpolymer of monomers consisting of N-vinyl-2-pyrrolidone, acrylamide, and sodium 2-acrylamido-2-methylpropane sulfonate wherein said monomers are provided in a 30:15:55 weight %, respectively; and (4) from 94 to 99.7 weight % of water; wherein said weight % is based on total weight of said composition.

28. A composition according to claim 1 wherein said composition comprises: (1) from 0.03 to 1.0 weight % of salicylic acid; (2) from 0.03 to 1.0 weight % of hexamethylenetetramine; (3) from 0.2 to 4 weight % of a terpolymer of monomers consisting of N-vinyl-2-pyrrolidone, acrylamide, and sodium 2-acrylamido-2-methylpropane sulfonate wherein said monomers are provided in a 30:15:55 weight %, respectively; and (4) from 94 to 99.7 weight % of water; wherein said weight % is based on total weight of said composition.

29. A composition according to claim 1 wherein said composition comprises: (1) from 0.03 to 1.0 weight % of phenyl salicylate; (2) from 0.03 to 1.0 weight % of hexamethylenetetramine; (3) from 0.2 to 4 weight % of a terpolymer of monomers consisting of N-vinyl-2-pyrrolidone, acrylamide, and sodium 2-acrylamido-2-methylpropane sulfonate wherein said monomers are provided in a 30:15:55 weight %, respectively; and (4) from 94 to 99.7 weight % of water; wherein said weight % is based on total weight of said composition.

30. A process for reducing the permeability of watered-out or oil-depleted zones in a high temperature subterranean formation comprising injecting a composition into said formation which forms a gel in said formation wherein said composition comprises: (1) a water dispersible crosslinking compound selected from the group consisting of p-aminosalicylic acid, RArOC(O)R' and HOArC(O)OR" wherein Ar represents a phenyl group which can be non-substituted or substituted; R is hydrogen or a carboxylic group; R' is a $C_1$–$C_6$ alkyl; R" is hydrogen, a phenyl group, or a $C_1$–$C_6$ alkyl; and when R is a carboxylic group, R and C(O)OR" can be at ortho, meta, or para position with respect to the OC(O)R' group and the OH group, respectively; (2) hexamethylenetetramine; (3) a water soluble acrylamide-containing polymer; and (4) water.

31. A process according to claim 30 wherein said composition comprises: (1) from 0.03 to 1.0 weight % of methyl p-hydroxybenzoate; (2) from 0.03 to 1.0 weight % of hexamethylenetetramine; (3) from 0.2 to 4 weight % of a terpolymer of monomers consisting of N-vinyl-2-pyrrolidone, acrylamide, and sodium 2-acrylamido-2-methylpropane sulfonate wherein said monomers are provided in a 30:15:55 weight %, respectively; and (4) from 94 to 99.7 weight % of water; wherein said weight % is based on total weight % said composition.

32. A process according to claim 30 wherein said composition comprises: (1) from 0.03 to 1.0 weight % of phenyl acetate; (2) from 0.03 to 1.0 weight % of hexamethylenetetramine; (3) from 0.2 to 4 weight % of a terpolymer of monomers consisting of N-vinyl-2-pyrrolidone, acrylamide, and sodium 2-acrylamido-2-methylpropane sulfonate wherein said monomers are provided in a 30:15:55 weight %, respectively; and (4) from 94 to 99.7 weight % of water; wherein said weight % is based on total weight % said composition.

33. A process according to claim 30 wherein said composition comprises: (1) from 0.03 to 1.0 weight % of phenyl salicylate; (2) from 0.03 to 1.0 weight % of hexamethylenetetramine; (3) from 0.2 to 4 weight % of a terpolymer of monomers consisting of N-vinyl-2-pyrrolidone, acrylamide, and sodium 2-acrylamido-2-methylpropane sulfonate wherein said monomers are provided in a 30:15:55 weight %, respectively; and (4) from 94 to 99.7 weight % of water; wherein said weight % is based on total weight % said composition.

34. A process according to claim 31 wherein said injecting is carried out in a subterranean formation at a temperature range of from about 150° F. to about 350° F.

* * * * *